United States Patent
Zhu et al.

(10) Patent No.: US 11,799,289 B2
(45) Date of Patent: Oct. 24, 2023

(54) GRID-TIED POWER GENERATION SYSTEM AND GRID-TIED POWER FLUCTUATION SUPPRESSION DEVICE AND METHOD THEREOF

(71) Applicants: Wanbang Digital Energy Co., Ltd., Jiangsu (CN); Wanbang Star Charge Technology Ltd., Jiangsu (CN)

(72) Inventors: Xuancai Zhu, Jiangsu (CN); Shen Chen, Jiangsu (CN); Xianfeng Yu, Jiangsu (CN); Xu Wang, Jiangsu (CN)

(73) Assignees: Wanbang Digital Energy Co., Ltd., Jiangsu (CN); Wanbang Star Charge Technology Ltd., Jiangsu (CN)

( * ) Notice: Subject to any disclaimer, the term of this patent is extended or adjusted under 35 U.S.C. 154(b) by 0 days.

(21) Appl. No.: 17/874,334

(22) Filed: Jul. 27, 2022

(65) Prior Publication Data
US 2023/0216295 A1    Jul. 6, 2023

(30) Foreign Application Priority Data
Dec. 30, 2021   (CN) .......................... 202111638129.1

(51) Int. Cl.
| H02J 3/00 | (2006.01) |
| H02J 3/32 | (2006.01) |
| H02J 3/38 | (2006.01) |

(52) U.S. Cl.
CPC .............. *H02J 3/002* (2020.01); *H02J 3/32* (2013.01); *H02J 3/381* (2013.01); *H02J 2300/24* (2020.01)

(58) Field of Classification Search
CPC .... H02J 3/002; H02J 3/32; H02J 3/381; H02J 3/382; H02J 3/383

(Continued)

(56) References Cited

U.S. PATENT DOCUMENTS 10,211,721 B2 *   2/2019   Becattini ................... H02J 3/50
2017/0040887 A1   2/2017   Becattini et al.

FOREIGN PATENT DOCUMENTS

CN        111769598       11/2021

OTHER PUBLICATIONS

"Office Action of China Counterpart Application", with English translation thereof, dated Feb. 14, 2022, p. 1-p. 4.

(Continued)

*Primary Examiner* — Hal Kaplan
(74) *Attorney, Agent, or Firm* — JCIPRNET

(57) ABSTRACT

The disclosure provides a grid-tied power generation system and a grid-tied power fluctuation suppression device and method thereof. The system includes a first direct current source, an inverter, and a power grid. The device includes a second direct current source, connected to a direct current side of the inverter; and a power allocation unit, respectively connected to the second direct current source and the inverter. The power allocation unit obtains a power reference value of the first direct current source and a power feedback value of the first direct current source, calculates an alternating current power reference value and a power reference value of the second direct current source according to the power reference value and the power feedback value, and controls the inverter through the alternating current power reference value and controls the second direct current source through the power reference value of the second direct current source.

9 Claims, 3 Drawing Sheets

(58) Field of Classification Search
USPC .......................................................... 307/142
See application file for complete search history.

(56) References Cited

OTHER PUBLICATIONS

"Search Report of Europe Counterpart Application", dated May 15, 2023, p. 1-p. 10.

* cited by examiner

GRID-TIED POWER GENERATION SYSTEM AND GRID-TIED POWER FLUCTUATION SUPPRESSION DEVICE AND METHOD THEREOF

CROSS-REFERENCE TO RELATED APPLICATION

This application claims the priority benefit of China application serial no. 202111638129.1, filed on Dec. 30, 2021. The entirety of the above-mentioned patent application is hereby incorporated by reference herein and made a part of this specification.

BACKGROUND

Technical Field

The disclosure relates to the technical field of grid-tied power generation systems, and in particular to a grid-tied power fluctuation suppression device of a grid-tied power generation system, a grid-tied power fluctuation suppression method of a grid-tied power generation system, and a grid-tied power generation system.

Description of Related Art

As one of the main technologies of new energy power generation, photovoltaic power generation has been widely applied. Although photovoltaic power generation systems account for a large proportion in the field of new energy power generation, due to the intermittent and fluctuating characteristics of photovoltaics, the grid-tied power fluctuates greatly, which may impact a power grid and even lead to instability of the power grid.

In order to suppress grid-tied power fluctuation of the photovoltaic system, a method based on a prediction model is proposed in the related art. Although certain effects can be achieved, the algorithm is complicated to implement and has poor practicability.

SUMMARY

The disclosure provides a grid-tied power fluctuation suppression device and method of a grid-tied power generation system, which can effectively suppress grid-tied power fluctuation of the grid-tied power generation system, reduce the impact on a power grid, and improve the performance of the grid-tied power generation system. Also, the controlling manner is simple, the requirement for computing power is low, the implementation cost is low, and the practicability is good.

The technical solutions adopted in the disclosure are as follows.

A grid-tied power fluctuation suppression device of a grid-tied power generation system is provided. The grid-tied power generation system includes a first direct current source, an inverter, and a power grid. A direct current side of the inverter is connected to a first direct current source, and an alternating current side of the inverter is connected to the power grid. The grid-tied power fluctuation suppression device includes a second direct current source and a power allocation unit. The second direct current source is connected to the direct current side of the inverter. The power allocation unit is respectively connected to the second direct current source and the inverter. The power allocation unit is used to obtain a power reference value of the first direct current source and a power feedback value of the first direct current source, calculate an alternating current power reference value and a power reference value of the second direct current source according to the power reference value of the first direct current source and the power feedback value of the first direct current source, and control the inverter through the alternating current power reference value and control the second direct current source through the power reference value of the second direct current source.

The power allocation unit includes a first obtaining circuit, a second obtaining circuit, a first adder, a regulator, a latch, a second adder, an amplifier, a bidirectional limiter, a third adder, a fourth adder, a first control circuit, and a second control circuit. The first obtaining circuit is used to obtain the power reference value of the first direct current source. The second obtaining circuit is used to obtain the power feedback value of the first direct current source. A positive input end of the first adder is connected to the first obtaining circuit, and a negative input end of the first adder is connected to the second obtaining circuit. An input end of the regulator is connected to an output end of the first adder. A positive input end of the second adder is connected to an output end of the regulator, and a negative input end of the second adder is connected to an output end of the latch. An input end of the amplifier is connected to an output end of the second adder. An input end of the bidirectional limiter is connected to an output end of the amplifier. A positive input end of the third adder is connected to an output end of the bidirectional limiter, another positive input end of the third adder is connected to the output end of the latch, and an output end of the third adder outputs the alternating current power reference value. An input end of the latch is connected to the output end of the third adder to latch the alternating current power reference value. A positive input end of the fourth adder is connected to the output end of the regulator, a negative input end of the fourth adder is connected to the output end of the third adder, and an output end of the fourth adder outputs the power reference value of the second direct current source. The first control circuit is connected to the output end of the third adder and is connected to the inverter to control the inverter through the alternating current power reference value. The second control circuit is connected to the output end of the fourth adder and is connected to the second direct current source to control the second direct current source through the power reference value of the second direct current source.

The calculation equation of the alternating current power reference value is as follows:

$$P_{ac\_ref} = P_{ac\_ref\_last} + \{\text{Sign}(P_{ref} - P_{ac\_ref\_last}) * \min\{K_{max}, |P_{ref} - P_{ac\_ref\_last}| * M\}\}/M$$

where $P_{ac\_ref}$ is the alternating current power reference value, $P_{ac\_ref\_last}$ is the alternating current power reference value of the previous control period latched in the latch, $P_{ref}$ is the output of the regulator, $K_{max}$ is the amplitude value of the bidirectional limiter, M is the gain of the amplifier, sign( ) is the symbolic operation, and min{ } is the minimum value operation.

The calculation equation of the power reference value of the second direct current source is as follows:

$$P_{dc2\_ref} = P_{ref} - P_{ac\_ref}$$

where $P_{dc2\_ref}$ is the power reference value of the second direct current source.

The first obtaining circuit obtains the power reference value of the first direct current source through communicating with the first direct current source.

The second obtaining circuit obtains the power feedback value of the first direct current source through communicating with the first direct current source. Alternatively, the second obtaining circuit obtains the power feedback value of the first direct current source through a sensor.

The regulator is a proportional regulator or a proportional-integral regulator.

The first direct current source is a photovoltaic panel, and the second direct current source is an energy storage battery.

A grid-tied power generation system includes a grid-tied power fluctuation suppression device of the grid-tied power generation system.

A grid-tied power fluctuation suppression method based on the grid-tied power fluctuation suppression device of the grid-tied power generation system includes the following steps. The power reference value of the first direct current source and the power feedback value of the first direct current source are obtained. The alternating current power reference value and the power reference value of the second direct current source are calculated according to the power reference value of the first direct current source and the power feedback value of the first direct current source. The inverter is controlled through the alternating current power reference value, and the second direct current source is controlled through the power reference value of the second direct current source.

Beneficial effects of the disclosure are as follows.

The disclosure obtains the power reference value of the first direct current source and the power feedback value of the first direct current source through the power allocation unit, calculates the alternating current power reference value and the power reference value of the second direct current source according to the power reference value of the first direct current source and the power feedback value of the first direct current source, and controls the inverter through the alternating current power reference value and controls the second direct current source through the power reference value of the second direct current source, so that grid-tied power fluctuation of the grid-tied power generation system can be effectively suppressed, the impact on the power grid is reduced, and the performance of the grid-tied power generation system is improved. Also, the controlling manner is simple, the requirement for computing power is low, the implementation cost is low, and the practicability is good.

DETAILED DESCRIPTION OF DISCLOSED EMBODIMENTS

The technical solutions in the embodiments of the disclosure will be clearly and completely described below with reference to the drawings in the embodiments of the disclosure. Obviously, the described embodiments are only a part, rather than all, of the embodiments of the disclosure. Based on the embodiments of the disclosure, all other embodiments obtained by persons skilled in the art without creative efforts shall fall within the protection scope of the disclosure.

Figure 1:
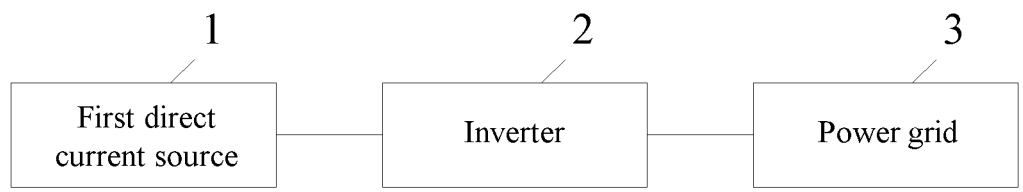
FIG. 1 is a schematic block diagram of a grid-tied power generation system according to an embodiment of the disclosure.

As shown in FIG. 1, a grid-tied power generation system according to an embodiment of the disclosure includes a first direct current source 1, an inverter 2, and a power grid 3. The first direct current source 1 is a power generation device. A direct current output by the power generation device may be converted into an alternating current through the inverter 2 and then supplied to the power grid 3. The power generation of the power generation device is prone to fluctuation, so it is necessary to perform the grid-tied power fluctuation suppression. In a specific embodiment of the disclosure, the first direct current source 1 may be a photovoltaic panel, that is, the specific embodiment of the disclosure relates to grid-tied power fluctuation suppression of a grid-tied photovoltaic power generation system.

Figure 2:
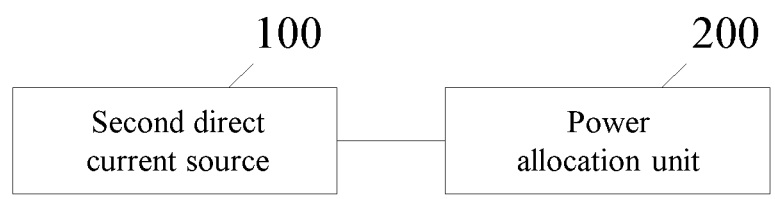
FIG. 2 is a schematic block diagram of a grid-tied power fluctuation suppression device of a grid-tied power generation system according to an embodiment of the disclosure.

As shown in FIG. 2, a grid-tied power fluctuation suppression device according to an embodiment of the disclosure includes a second direct current source 100 and a power allocation unit 200. The second direct current source 100 is connected to a direct current side of the inverter 2. The power allocation unit 200 is respectively connected to the second direct current source 100 and the inverter 2. The power allocation unit 200 is used to obtain a power reference value of the first direct current source 1 and a power feedback value of the first direct current source 1, calculate an alternating current power reference value and a power reference value of the second direct current source 100 according to the power reference value of the first direct current source 1 and the power feedback value of the first direct current source 1, and control the inverter 2 through the alternating current power reference value and control the second direct current source 100 through the power reference value of the second direct current source 100.

The power reference value of the first direct current source 1 is the power of the first direct current source 1 given in a control command for the first direct current source 1 when a controller in the grid-tied power generation system performs power generation control, and the power feedback value of the first direct current source 1 is the actual power generation of the first direct current source 1. The power allocation unit 200 of the embodiment of the disclosure may decompose the control command for the first direct current source 1 into two parts. One part contains the alternating current power reference value, that is, a grid-tied power reference value, which is used to control the inverter 2 and give a grid-tied power. The other part contains the power reference value of the second direct current source 100, which is used to control the second direct current source 100 and give the power of the second direct current source 100 participating in power regulation, thereby implementing grid-tied power fluctuation suppression.

In an embodiment of the disclosure, the second direct current source 100 may be an energy storage battery.

Figure 3:
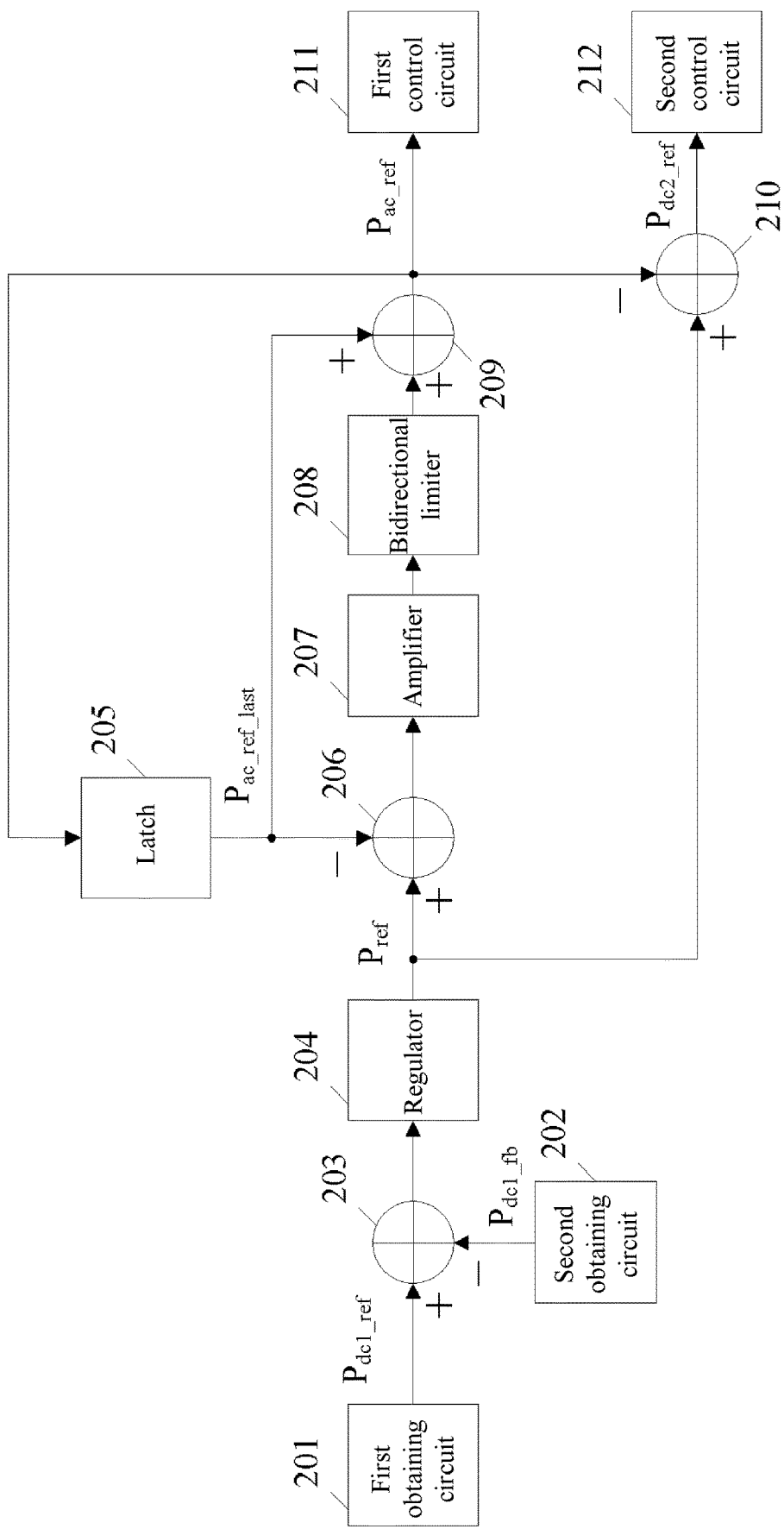
FIG. 3 is a schematic structural diagram of a power allocation unit according to an embodiment of the disclosure.

In an embodiment of the disclosure, as shown in FIG. 3, the power allocation unit 200 includes a first obtaining circuit 201, a second obtaining circuit 202, a first adder 203, an regulator 204, a latch 205, a second adder 206, an amplifier 207, a bidirectional limiter 208, a third adder 209, a fourth adder 210, a first control circuit 211, and a second control circuit 212. The first obtaining circuit 201 is used to obtain a power reference value $P_{dc1\_ref}$ of the first direct current source 1. The second obtaining circuit 202 is used to obtain a power feedback value $P_{dc1\_fb}$ of the first direct current source 1. A positive input end of the first adder 203 is connected to the first obtaining circuit 201, and a negative input end of the first adder 203 is connected to the second obtaining circuit 202. An input end of the regulator 204 is connected to an output end of the first adder 203. A positive input end of the second adder 206 is connected to an output end of the regulator 204, and a negative input end of the second adder 206 is connected to an output end of the latch 205. An input end of the amplifier 207 is connected to an output end of the second adder 206. An input end of the bidirectional limiter 208 is connected to an output end of the amplifier 207. A positive input end of the third adder 209 is connected to an output end of the bidirectional limiter 208, another positive input end of the third adder 209 is connected to the output end of the latch 205, and an output end of the third adder 209 outputs an alternating current power reference value $P_{ac\_ref}$. An input end of the latch 205 is connected to the output end of the third adder 209 to latch the alternating current power reference value. A positive input end of the fourth adder 210 is connected to the output end of the regulator 204, a negative input end of the fourth adder 210 is connected to the output end of the third adder 209, and an output end of the fourth adder 210 outputs a power reference value $P_{dc2\_ref}$ of the second direct current source 100. The first control circuit 211 is connected to the output end of the third adder 209 and is connected to the inverter 2 to control the inverter 2 through the alternating current power reference value. The second control circuit 212 is connected to the output end of the fourth adder 210 and is connected to the second direct current source 100 to control the second direct current source 100 through the power reference value of the second direct current source 100.

In an embodiment of the disclosure, the grid-tied power fluctuation suppression device may implement the control process at a preset period. For example, when the control period is 50 ms, the power allocation unit 200 may calculate the alternating current power reference value and the power reference value of the second direct current source 100 once, and control the inverter 2 once and control the second direct current source 100 once in each control period, that is, 50 ms. In the current control period, the output of the latch 205 to the negative input end of the second adder 206 and the other positive input end of the third adder 209 is an alternating current power reference value $P_{ac\_ref\_last}$ of the previous control period.

In an embodiment of the disclosure, the first obtaining circuit 201 may obtain the power reference value $P_{dc1\_ref}$ of the first direct current source 1 through communicating with the first direct current source 1, and the second obtaining circuit 202 may obtain the power feedback value $P_{dc1\_fb}$ of the first direct current source 1 through communicating with the first direct current source 1. In other embodiments of the disclosure, the second obtaining circuit 202 may also obtain the power feedback value $P_{dc1\_fb}$ of the first direct current source 1 through a sensor. For example, the power feedback value $P_{dc1\_fb}$ of the first direct current source 1 may be obtained through disposing a voltage sensor and a current sensor at the output end of the first direct current source 1.

In an embodiment of the disclosure, the regulator 204 may be a proportional regulator, a proportional-integral regulator, etc. The function implemented by the regulator 204 is to enable the actual output power of the first direct current source 1 to track the given power thereof, and the output is $P_{ref}$, which is equivalent to the regulated actual output power of the first direct current source 1.

Based on the above structure of the power allocation unit 200, the calculation equation of the alternating current power reference value is as follows:

$$P_{ac\_ref} = P_{ac\_ref\_last} + \{\text{sign}(P_{ref} - P_{ac\_ref\_last}) * \min\{K_{max}, |P_{ref} - P_{ac\_ref\_last}| * M\}\}/M$$

where $P_{ac\_ref}$ is the alternating current power reference value, $P_{ac\_ref\_last}$ is the alternating current power reference value of the previous control period latched in the latch 205, $P_{ref}$ is the output of the regulator 204, $K_{max}$ is the amplitude value of the bidirectional limiter 208, M is the gain of the amplifier 207, sign( ) is the symbolic operation, and min{ } is the minimum value operation.

The calculation equation of the power reference value of the second direct current source 100 is as follows:

$$P_{dc2\_ref} = P_{ref} - P_{ac\_ref}$$

where $P_{dc2\_ref}$ is the power reference value of the second direct current source 100.

If $|P_{ref} - P_{ac\_ref\_last}| * M \le K_{max}$, it means that the grid-tied power change in the current control period is within a preset range relative to the previous control period, grid-tied power fluctuation is relatively small, no suppression is required, the alternating current power reference value $P_{ac\_ref} = P_{ref}$, and the power reference value $P_{dc2\_ref}$ of the second direct current source 100=0. At this time, the second direct current source 100 does not participate in power regulation. If $|P_{ref} - P_{ac\_ref\_last}| * M > K_{max}$, it means that the grid-tied power change in the current control period is outside the preset range relative to the previous control period, grid-tied power fluctuation is relatively large, suppression is required, the alternating current power reference value $P_{ac\_ref} = P_{ac\_ref\_last} + \text{sign}(P_{ref} - P_{ac\_ref\_last}) * K_{max}/M$, and the power reference value $P_{dc2\_ref}$ of the second direct current source 100=$P_{ref} - P_{ac\_ref\_last} - \text{sign}(P_{ref} - P_{ac\_ref\_last}) * K_{max}/M$. At this time, the second direct current source 100 participates in power regulation.

Since the control results of grid-tied power fluctuation suppression are all related to the gain M of the amplifier 207 and the amplitude $K_{max}$ of the bidirectional limiter 208, the rate of change of grid-tied power may be regulated through regulating the gain M of the amplifier 207 and the amplitude $K_{max}$ of the bidirectional limiter 208, that is, the suppression depth of the embodiment of the disclosure may be regulated, which can improve the flexibility of the system configuration. For example, under the same M, when $K_{max}$ becomes larger, the acceptable rate of change of grid-tied power is larger, the frequency of the second direct current source 100 participating in power regulation decreases, and when the second direct current source 100 participates in power regulation, the amplitude of regulation decreases, and the grid-tied power reference value given by the power allocation unit 200 has a larger rate of change, that is, the suppression depth becomes smaller. On the contrary, when $K_{max}$ becomes smaller, the frequency of the second direct current source 100 participating in power regulation increases, and when the second direct current source 100 participates in power regulation, the amplitude of regulation increases, and the grid-tied power reference value given by the power allocation unit 200 has a smaller rate of change, that is, the suppression depth becomes larger. For another example, under the same $K_{max}$, when M becomes smaller, the acceptable rate of change of grid-tied power is larger, the frequency of the second direct current source 100 participating in power regulation decreases, and when the second direct current source 100 participates in power regulation, the amplitude of regulation decreases, and the grid-tied power reference value given by the power allocation unit 200 has a larger rate of change, that is, the suppression depth becomes smaller. On the contrary, when M becomes larger, the suppression depth becomes larger.

In a grid-tied power fluctuation suppression device of a grid-tied power generation system according to an embodiment of the disclosure, a power reference value of a first direct current source and a power feedback value of the first direct current source are obtained through a power allocation unit, an alternating current power reference value and a power reference value of a second direct current source are calculated according to the power reference value of the first direct current source and the power feedback value of the first direct current source, and an inverter is controlled through the alternating current power reference value and the second direct current source is controlled through the power reference value of the second direct current source, so that grid-tied power fluctuation of the grid-tied power generation system can be effectively suppressed, the impact on the power grid is reduced, and the performance of the grid-tied power generation system is improved. Also, the controlling manner is simple, the requirement for computing power is low, the implementation cost is low, and the practicability is good.

Based on the grid-tied power fluctuation suppression device of the grid-tied power generation system of the above embodiment, the disclosure also provides a grid-tied power generation system.

A grid-tied power generation system according to an embodiment of the disclosure includes the grid-tied power fluctuation suppression device of the grid-tied power generation system according to any of the above embodiments of the disclosure. For the specific implementation manner, reference may be made to the grid-tied power fluctuation suppression device of the above embodiments, which will not be repeated here.

The grid-tied power generation system according to the embodiment of the disclosure can effectively suppress grid-tied power fluctuation, reduce the impact on the power grid, and improve the performance. Also, the controlling manner is simple, the requirement for computing power is low, the implementation cost is low, and the practicability is good.

Based on the grid-tied power fluctuation suppression device of the grid-tied power generation system of the above embodiment, the disclosure also provides a grid-tied power fluctuation suppression method of a grid-tied power generation system.

Figure 4:
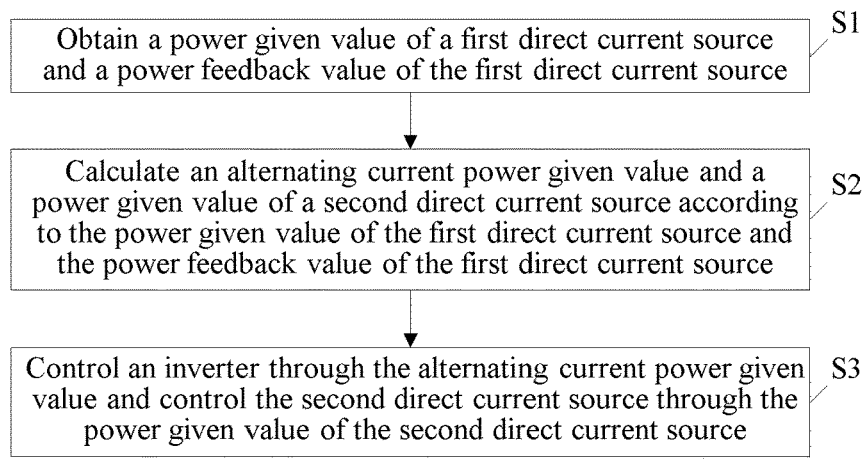
FIG. 4 is a flowchart of a grid-tied power fluctuation suppression method of a grid-tied power generation system according to an embodiment of the disclosure.

As shown in FIG. 4, the grid-tied power fluctuation suppression method of the grid-tied power generation system according to the embodiment of the disclosure includes the following steps.

In S1, a power reference value of a first direct current source and a power feedback value of the first direct current source are obtained.

In S2, an alternating current power reference value and a power reference value of a second direct current source are calculated according to the power reference value of the first direct current source and the power feedback value of the first direct current source.

In an embodiment of the disclosure, the calculation equation of the alternating current power reference value is as follows:

$$P_{ac\_ref} = P_{ac\_ref\_last} + \{\text{sign}(P_{ref} - P_{ac\_ref\_last}) * \min\{K_{max}, |P_{ref} - P_{ac\_ref\_last}| * M\}\}/M$$

where $P_{ac\_ref}$ is the alternating current power reference value, $P_{ac\_ref\_last}$ is the alternating current power reference value of the previous control period latched in the latch, $P_{ref}$ is the output of the regulator, $K_{max}$ is the amplitude value of the bidirectional limiter, M is the gain of the amplifier, sign( ) is the symbolic operation, and min{ } is the minimum value operation.

The calculation equation of the power reference value of the second direct current source is as follows:

$$P_{dc2\_ref} = P_{ref} - P_{ac\_ref}$$

where $P_{dc2\_ref}$ is the power reference value of the second direct current source.

In S3, an inverter is controlled through the alternating current power reference value and the second direct current source is controlled through the power reference value of the second direct current source.

If $..P_{ref} - P_{ac\_ref\_last}| * M \leq K_{max}$, it means that the grid-tied power change in the current control period is within a preset range relative to the previous control period, grid-tied power fluctuation is relatively small, no suppression is required, the alternating current power reference value $P_{ac\_ref} = P_{ref}$, and the power reference value $P_{dc2\_ref}$ of the second direct current source=0. At this time, the second direct current source does not participate in power regulation. If $|P_{ref} - P_{ac\_ref\_last}| * M > K_{max}$, it means that the grid-tied power change in the current control period is outside the preset range relative to the previous control period, grid-tied power fluctuation is relatively large, suppression is required, the alternating current power reference value $P_{ac\_ref} = P_{ac\_ref\_last} + \text{sign}(P_{ref} - P_{ac\_ref\_last}) * K_{max}/M$, and the power reference value $P_{dc2\_ref}$ of the second direct current source=$P_{ref} - P_{ac\_ref\_last} - \text{sign}(P_{ref} - P_{ac\_ref\_last}) * K_{max}/M$. At this time, the second direct current source participates in power regulation.

Since the control results of grid-tied power fluctuation suppression are all related to the gain M of the amplifier and the amplitude $K_{max}$ of the bidirectional limiter, the rate of change of grid-tied power may be regulated through regulating the gain M of the amplifier and the amplitude $K_{max}$ of the bidirectional limiter, that is, the suppression depth of the embodiment of the disclosure may be regulated, which can improve the flexibility of the system configuration. For example, under the same M, when $K_{max}$ becomes larger, the acceptable rate of change of grid-tied power is larger, the frequency of the second direct current source participating in power regulation decreases, and when the second direct current source participates in power regulation, the amplitude of regulation decreases, and the grid-tied power reference value has a larger rate of change, that is, the suppression depth becomes smaller. On the contrary, when $K_{max}$ becomes smaller, the frequency of the second direct current source participating in power regulation increases, and when the second direct current source participates in power regulation, the amplitude of regulation increases, and the grid-tied power reference value has a smaller rate of change, that is, the suppression depth becomes larger. For another example, under the same $K_{max}$, when M becomes smaller, the acceptable rate of change of grid-tied power is larger, the frequency of the second direct current source participating in power regulation decreases, and when the second direct current source participates in power regulation, the amplitude of regulation decreases, and the grid-tied power reference value has a larger rate of change, that is, the suppression depth becomes smaller. On the contrary, when M becomes larger, the suppression depth becomes larger.

In the grid-tied power fluctuation suppression method of the grid-tied power generation system according to the embodiment of the disclosure, the power reference value of the first direct current source and the power feedback value of the first direct current source are obtained, the alternating current power reference value and the power reference value of the second direct current source are calculated according to the power reference value of the first direct current source and the power feedback value of the first direct current source, and the inverter is controlled through the alternating current power reference value and the second direct current source is controlled through the power reference value of the second direct current source. Therefore, grid-tied power fluctuation of the grid-tied power generation system can be effectively suppressed, the impact on the power grid can be reduced, and the performance of the grid-tied power generation system can be improved. Also, the controlling manner is simple, the requirement for computing power is low, the implementation cost is low, and the practicability is good.

Figure 5:
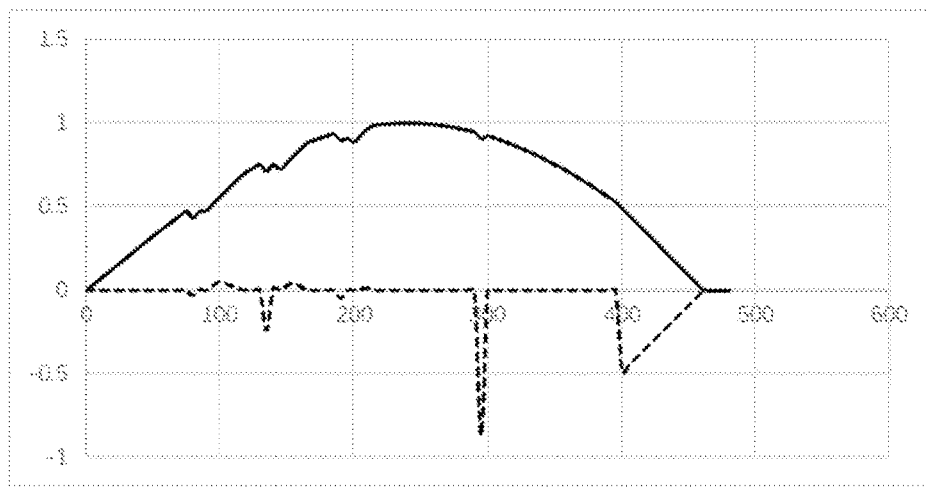
FIG. 5 is a schematic diagram of a first working waveform involved in an embodiment of the disclosure.

A first working waveform involved in the practical application of the grid-tied power generation system and the grid-tied power fluctuation suppression device and method thereof according to the embodiments of the disclosure is shown in FIG. 5. The abscissa in the drawing is time, the unit is minutes, and the ordinate is the power per unit value (the base value is the rated power of the inverter). The solid line in FIG. 5 is the alternating current power reference value $P_{ac\_ref}$ calculated by the power allocation unit, and the dotted line is the power reference value $P_{dc2\_ref}$ of the second direct current source calculated by the power allocation unit. It can be seen from FIG. 5 that the power allocation unit of the embodiment of the disclosure can effectively decompose the power reference values for respectively controlling the inverter and the second direct current source.

Figure 6:
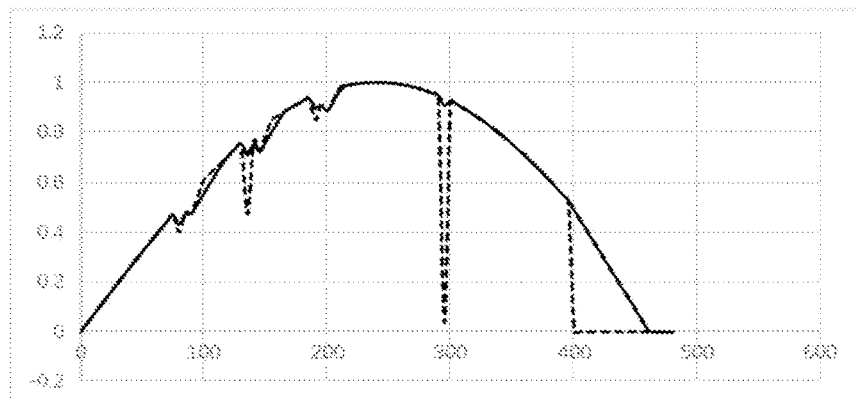
FIG. 6 is a schematic diagram of a second working waveform involved in an embodiment of the disclosure.

A second working waveform involved in the practical application of the grid-tied power generation system and the grid-tied power fluctuation suppression device and method thereof according to the embodiments of the disclosure is shown in FIG. 6. The abscissa in the drawing is time, the unit is minutes, and the ordinate is power per unit value (the base value is the rated power of the inverter). The dotted line in FIG. 6 is a grid-tied power curve before the implementation of the solution of the embodiment of the disclosure, and the solid line is a grid-tied power curve after the implementation of the solution of the embodiment of the disclosure. It can be seen from FIG. 6 that the embodiment of the disclosure can significantly suppress grid-tied power fluctuation.

In the description of the disclosure, the terms "first" and "second" are only used for the purpose of description and cannot be understood as indicating or implying relative importance or implying the number of indicated technical features. Thus, a feature defined with "first" or "second" may expressly or implicitly include one or more of such features.

In the description of this specification, description with reference to terms such as "an embodiment", "some embodiments", "example", "specific example", or "some examples" means that a specific feature, structure, material, or characteristic described in conjunction with the embodiment or the example is included in at least one embodiment or example of the disclosure. In this specification, schematic representations of the above terms are not necessarily directed to the same embodiment or example. Furthermore, the specific feature, structure, material, or characteristic described may be combined in any suitable manner in any one or more embodiments or examples. Furthermore, without conflicting each other, persons skilled in the art may mix and match different embodiments or examples described in this specification and the features of different embodiments or examples.

Any description of a process or a method in a flowchart or otherwise described herein may be understood to represent a module, a segment, or a part of codes including one or more executable commands for implementing a specified logic function or steps of the process, and the scope of the preferred embodiments of the disclosure includes additional implementations, wherein the function may be executed out of the order shown or discussed, including in a substantially simultaneous manner or in a reverse order depending on the function involved, which should be understood by persons skilled in the art to which the embodiments of the disclosure pertain.

It should be understood that various parts of the disclosure may be implemented in hardware, software, firmware, or a combination thereof. In the above embodiments, various steps or methods may be implemented in software or firmware stored in a memory and executed by a suitable command execution system. For example, if implemented in hardware, as in another embodiment, the same may be implemented by any one or a combination of the following techniques known in the art: a discrete logic circuit with a logic gate for implementing a logic function on a data signal, an application specific integrated circuit with a suitable combinational logic gate, a programmable gate array (PGA), a field programmable gate array (FPGA), etc.

In addition, various functional units in each embodiment of the disclosure may be integrated into one processing module or may exist physically alone, or two or more units may be integrated into one module. The integrated module may be implemented in the form of hardware or may also be implemented in the form of a software functional module. If the integrated module is implemented in the form of a software functional module and is sold or used as an independent product, the same may also be stored in a computer-readable storage medium.

Although the embodiments of the disclosure have been shown and described above, it should be understood that the above embodiments are exemplary and should not be construed as limiting the disclosure. Persons skilled in the art may make changes, modifications, substitutions, and alterations to the above embodiments within the scope of the disclosure.

What is claimed is:

1. A grid-tied power fluctuation suppression device for a grid-tied power generation system, wherein the grid-tied power generation system comprises a first direct current source, an inverter, and a power grid, a direct current side of the inverter is connected to the first direct current source, and an alternating current side of the inverter is connected to the power grid, the grid-tied power fluctuation suppression device comprising:
a second direct current source, connected to the direct current side of the inverter;
a power allocation unit, respectively connected to the second direct current source and the inverter, wherein the power allocation unit is used to obtain a power reference value of the first direct current source and a power feedback value of the first direct current source, calculate an alternating current power reference value and a power reference value of the second direct current source according to the power reference value of the first direct current source and the power feedback value of the first direct current source, and control the inverter through the alternating current power reference value and control the second direct current source through the power reference value of the second direct current source.

2. The grid-tied power fluctuation suppression device of the grid-tied power generation system according to claim 1, wherein the power allocation unit comprises:
a first obtaining circuit, used to obtain the power reference value of the first direct current source;
a second obtaining circuit, used to obtain the power feedback value of the first direct current source;
a first adder, wherein a positive input end of the first adder is connected to the first obtaining circuit, and a negative input end of the first adder is connected to the second obtaining circuit;
a regulator, wherein an input end of the regulator is connected to an output end of the first adder;
a latch;
a second adder, wherein a positive input end of the second adder is connected to an output end of the regulator, and a negative input end of the second adder is connected to an output end of the latch;
an amplifier, wherein an input end of the amplifier is connected to an output end of the second adder;
a bidirectional limiter, wherein an input end of the bidirectional limiter is connected to an output end of the amplifier;
a third adder, wherein a positive input end of the third adder is connected to an output end of the bidirectional limiter, another positive input end of the third adder is connected to the output end of the latch, and an output end of the third adder outputs the alternating current power reference value, wherein an input end of the latch is connected to the output end of the third adder to latch the alternating current power reference value;
a fourth adder, wherein a positive input end of the fourth adder is connected to the output end of the regulator, a negative input end of the fourth adder is connected to the output end of the third adder, and an output end of the fourth adder outputs the power reference value of the second direct current source;
a first control circuit, connected to the output end of the third adder and connected to the inverter to control the inverter through the alternating current power reference value;
a second control circuit, connected to the output end of the fourth adder and connected to the second direct current source to control the second direct current source through the power reference value of the second direct current source.

3. The grid-tied power fluctuation suppression device of the grid-tied power generation system according to claim 2, wherein a calculation equation of the alternating current power reference value is as follows:

$$P_{ac\_ref}=P_{ac\_ref\_last}+\{\text{sign}(P_{ref}-P_{ac\_ref\_last})*\min\{K_{max},|P_{ref}-P_{ac\_ref\_last}|*M\}\}/M$$

where $P_{ac\_ref}$ is the alternating current power reference value, $P_{ac\_ref\_last}$ is an alternating current power reference value of a previous control period latched in the latch, $P_{ref}$ is an output of the regulator, $K_{max}$ is an amplitude value of the bidirectional limiter, M is a gain of the amplifier, sign( ) is a symbolic operation, and min{ } is a minimum value operation; and a calculation equation of the power reference value of the second direct current source is as follows:

$$P_{dc2\_ref}=P_{ref}-P_{ac\_ref}$$

where $P_{dc2\_ref}$ is the power reference value of the second direct current source.

4. The grid-tied power fluctuation suppression device of the grid-tied power generation system according to claim 2, wherein the first obtaining circuit obtains the power reference value of the first direct current source through communicating with the first direct current source.

5. The grid-tied power fluctuation suppression device of the grid-tied power generation system according to claim 2, wherein the second obtaining circuit obtains the power feedback value of the first direct current source through communicating with the first direct current source or the second obtaining circuit obtains the power feedback value of the first direct current source through a sensor.

6. The grid-tied power fluctuation suppression device of the grid-tied power generation system according to claim 2, wherein the regulator is a proportional regulator or a proportional-integral regulator.

7. The grid-tied power fluctuation suppression device of the grid-tied power generation system according to claim 1, wherein the first direct current source is a photovoltaic panel, and the second direct current source is an energy storage battery.

8. A grid-tied power generation system, comprising the grid-tied power fluctuation suppression device of the grid-tied power generation system according to claim 1.

9. A grid-tied power fluctuation suppression method performed by the grid-tied power fluctuation suppression device of the grid-tied power generation system according to claim 1, comprising:
obtaining the power reference value of the first direct current source and the power feedback value of the first direct current source;
calculating the alternating current power reference value and the power reference value of the second direct current source according to the power reference value of the first direct current source and the power feedback value of the first direct current source; and
controlling the inverter through the alternating current power reference value and controlling the second direct current source through the power reference value of the second direct current source.

* * * * *